(12) United States Patent
Cui et al.

(10) Patent No.: US 12,052,621 B2
(45) Date of Patent: Jul. 30, 2024

(54) DIRECT SCELL ACTIVATION DURING HANDOVER

(71) Applicant: APPLE INC., Cupertino, CA (US)

(72) Inventors: Jie Cui, Cupertino, CA (US); Dawei Zhang, Cupertino, CA (US); Fangli Xu, Beijing (CN); Haitong Sun, Cupertino, CA (US); Hong He, Cupertino, CA (US); Huaning Niu, Cupertino, CA (US); Manasa Raghavan, Cupertino, CA (US); Qiming Li, Beijing (CN); Xiang Chen, Cupertino, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 413 days.

(21) Appl. No.: 17/593,682

(22) PCT Filed: Jan. 15, 2021

(86) PCT No.: PCT/CN2021/072279
§ 371 (c)(1),
(2) Date: Sep. 22, 2021

(87) PCT Pub. No.: WO2022/151402
PCT Pub. Date: Jul. 21, 2022

(65) Prior Publication Data
US 2023/0345325 A1 Oct. 26, 2023

(51) Int. Cl.
*H04W 36/08* (2009.01)
*H04B 7/06* (2006.01)
(Continued)

(52) U.S. Cl.
CPC .......... *H04W 36/08* (2013.01); *H04B 7/0626* (2013.01); *H04W 56/0045* (2013.01); *H04W 74/0833* (2013.01)

(58) Field of Classification Search
CPC ............ H04B 7/0626; H04W 36/0069; H04W 36/08; H04W 56/0045; H04W 74/0833; H04W 76/15
See application file for complete search history.

(56) References Cited

U.S. PATENT DOCUMENTS

| 2013/0208641 A1* | 8/2013 | Baghel | .................... H04W 8/00 370/336 |
| 2018/0332507 A1* | 11/2018 | Fujishiro | .................. H04J 11/00 |

(Continued)

FOREIGN PATENT DOCUMENTS

| CN | 109997385 A | 7/2019 |
| CN | 112042224 A | 12/2020 |

OTHER PUBLICATIONS

PCT/CN2021/072279 , International Search Report and Written Opinion, Oct. 9, 2021, 9 pages.

*Primary Examiner* — Kashif Siddiqui
(74) *Attorney, Agent, or Firm* — Dorsey & Whitney LLP

(57) ABSTRACT

Provided is a method for a user equipment (UE), that includes: obtaining, from a source cell, a handover command for handover from the source cell to a target cell, the handover command including activation indication for an activation of a secondary cell (SCell) of the target cell; generating a first message for transmission to the target cell, wherein the first message is used for initiating a random access procedure; obtaining a second message from the target cell in response to the first message, wherein the second message comprises a timing advance (TA) command.

13 Claims, 13 Drawing Sheets

(51) Int. Cl.
*H04W 56/00* (2009.01)
*H04W 74/0833* (2024.01)

(56) References Cited

U.S. PATENT DOCUMENTS

| | | | |
|---|---|---|---|
| 2019/0037458 A1* | 1/2019 | Kadiri | H04W 48/12 |
| 2020/0367118 A1 | 11/2020 | Fujishiro | |
| 2020/0383119 A1* | 12/2020 | Sun | G16Y 10/75 |
| 2021/0377988 A1* | 12/2021 | Zhou | H04L 5/0096 |
| 2022/0140877 A1* | 5/2022 | Taherzadeh Boroujeni | H04W 74/0833 370/329 |
| 2023/0093843 A1* | 3/2023 | Wu | H04W 72/231 370/329 |

* cited by examiner

DIRECT SCELL ACTIVATION DURING HANDOVER

TECHNICAL FIELD

This application relates generally to wireless communication systems, and more specifically to activation for secondary cells.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method for a user equipment (UE) is provided that comprises obtaining, from a source cell, a handover command for handover from the source cell to a target cell, the handover command including activation indication for an activation of a secondary cell (SCell) of the target cell; generating a first message for transmission to the target cell, wherein the first message is used for initiating a random access procedure; obtaining a second message from the target cell in response to the first message, wherein the second message comprises a timing advance (TA) command.

According to an aspect of the present disclosure, a method for a base station is provided that comprises obtaining, from a source base station, a handover request for handover from a source cell to a target cell supported by the base station for a user equipment (UE); generating, for transmission to the source base station, a handover request response including an acknowledgment of the handover; obtaining, from the UE, a first message for initiating a random access process; in response to obtaining the first message, generating a second message for transmission to the UE, wherein the second message comprises a timing advance (TA) command.

According to an aspect of the present disclosure, an apparatus for a user equipment (UE) is provided that comprises: one or more processors configured to perform steps of the above-mentioned method; and a memory interface configured to send to a memory the first message and the second message.

According to an aspect of the present disclosure, an apparatus for a base station that comprises: one or more processors configured to perform steps of the above-mentioned method; and a memory interface configured to send to a memory the first message and the second message.

According to an aspect of the present disclosure, it is provided a computer readable medium having computer programs stored thereon which, when executed by one or more processors, cause an apparatus to perform steps of the above-mentioned method.

According to an aspect of the present disclosure, it is provided an apparatus for a communication device, comprising means for performing steps of the above-mentioned method.

According to an aspect of the present disclosure, it is provided a computer program product comprising computer programs which, when executed by one or more processors, cause an apparatus to perform steps of the above-mentioned method.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

Carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

In order to increase the bandwidth and thus increasing the bitrate, a user equipment (UE) may be connected to more than one serving cell. In New Radio (NR), one serving cell may be designated as a primary cell (PCell), while some other cells may be secondary cells (SCells). In some cases, a PCell and SCells for UE may correspond to (supported by) a same base station. In some other cases, PCell and SCells may correspond to (supported by) different base stations.

In wireless communications, every frequency band has a primary component carrier which is called a primary cell (PCell) and others are called secondary cell (SCell). Whenever necessary, the SCell can be activated for data transmission.

Figure 1:
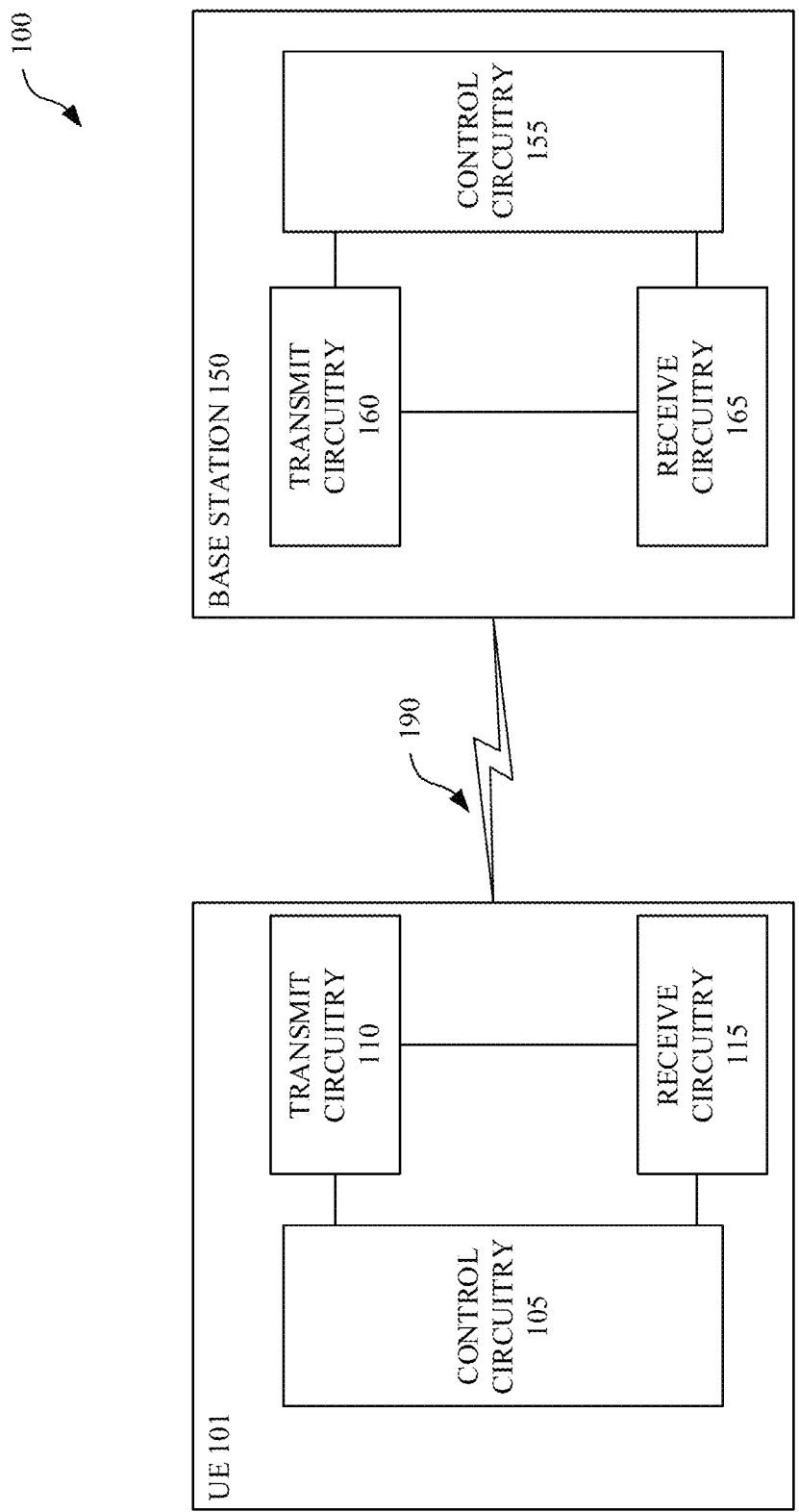
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 1 10 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 1 10 and the receive circuitry 1 15 may transmit and receive both control data and content data (e.g. messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink superframe that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

The UE and various base stations (for example, base stations that support all kinds of serving cells including PCell and SCell, or base stations that act as the network device of PCell or SCell for communicating with the UE)

described in the following embodiments may be implemented by the UE 101 and the base station 150 described in FIG. 1.

Figure 2:
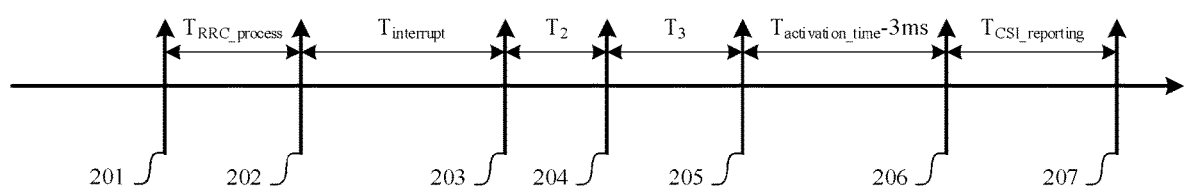
FIG. 2 illustrates an exemplary process for direct SCell activation during a handover.

FIG. 2 illustrates an exemplary process for direct SCell activation during a handover.

At operation 201, a source cell may communicate a handover command to a UE, which can be RRC signaling such as RRC connection reconfiguration signaling. The handover command may be used for handover from the source cell to a target cell and may include activation indication for an of a SCell of the target cell (e.g., a target PCell). Based on the activation indication, the UE may initiate SCell activation after successful handover sequentially.

At operation 202, after a RRC procedure delay $T_{RRC\_Process}$, the UE may start to perform handover from the source cell to the target cell.

After an interruption time $T_{interrupt}$ during handover, the UE may perform a random access procedure with the target cell. The interruption time $T_{interrupt}$ is a time between end of a last Transmission Time Interval (TTI) containing a RRC command on old Physical Downlink Shared Channel (PDSCH) and the time the UE starts transmission of the new Physical Random Access Channel (PRACH), excluding the RRC procedure delay.

At operation 203, the UE may start a Random Access Channel (RACH) process with the target cell. The UE may send a first message (msg 1) to the target cell. The first message may include a RACH preamble.

At operation 204, after a delay $T_2$ from operation 203, the UE may obtain a second message (msg 2) from the target cell. The second message may be a Random Access Response (RAR) including a timing advance (TA) command.

At operation 205, after a delay $T_3$ for applying a TA value according to the received TA command for uplink transmission in the target cell, the UE may apply the TA value and start a radio Frequency (RF) process (e.g., a RF tuning process) and a Baseband (BB) process for the activation of the SCell of the target cell.

After an activation time period (for example, $T_{CSI\_reporting}$ a predetermined time period (e.g. 3 ms)), the activation for the SCell is ready. The activation time period may be a SCell activation delay in millisecond. The UE may start to perform cell measurements at operation 206.

After a period of $T_{CSI\_reporting}$, at operation 207, the UE may report valid Channel State Information (CSI) information to the target cell, and may communicated data via an activated SCell. $T_{CSI\_reporting}$ is a delay (in ms) including uncertainty in acquiring a first available downlink CSI reference resource. UE processing time for CSI reporting and uncertainty in acquiring the first available CSI reporting resources.

As shown in the process illustrated in FIG. 2, the SCell may be directly activated during a handover procedure. The direct SCell activation period is designed as $N_{direct}$ as following.

$N_{direct} = T_{RRC\_process} + T_{interrupt} + T_2 + T_3 + T_{activation\_time} + T_{CSI\_Reporting}$ –the predetermined time period.

$T_{RRC\_process}$: RRC procedure delay defined in clause 12 of TS 38.331 [2], $T_{interrupt}$: Interruption time during handover as specified in clause 6.1.1, $T_2$: Delay from slot $$n + \frac{T_{RRC\_Process} + T_{interrupt}}{NR \text{ slot length}}$$

until UE has obtained a valid TA command for the target PCell, $T_3$: Delay for applying the received TA for uplink transmission in the target PCell, and greater than or equal to k+1 slot, where k is defined in clause 4.2 in TS 38.213, $T_{activation\_time}$ and $T_{CSI\_Reporting}$ are specified in clause 8.3.2.

However, in some cases, e.g., for contention based random access (CBRA), the access to the target cell has not been guaranteed when the second message is received at operation 204. With the RAR received from the target cell, the UE may still fail to access to the target cell. Therefore, since the activation of the SCell starts before the RACH process has finished, if the RACH process fails, the activation of the SCell may be unnecessary.

Furthermore, for other cases in which the RACH process is guaranteed when msg 2 has been received, the activation of the SCell does not have to wait until the TA value has been applied.

Figure 3:
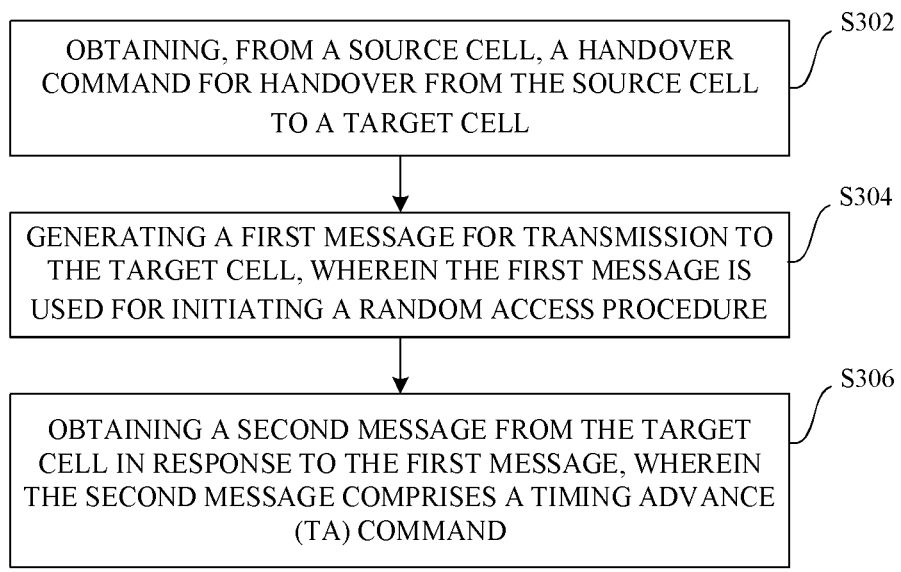
FIG. 3 illustrates a flowchart for an exemplary method for a user device in accordance with some embodiments.

FIG. 3 illustrates a flowchart for an exemplary method for a user device in accordance with some embodiments. The method 300 illustrated in FIG. 3 may be implemented by the UE 101 described in FIG. 1.

At step S302, the UE may obtain, from a source cell, a handover command for handover from the source cell to a target cell, the handover command including activation indication for an activation of a SCell of the target cell. The handover command may be transmitted via Radio Resource Control signaling.

Note that, in the present disclosure, when describing a communication between a UE and a network (for example, transmitting to a network, receiving from a network), the communication between the UE and the network may include the communication between the UE/an apparatus of the UE and the network/a network device (node) in the network. Similarly, in the present disclosure, when describing a communication between a UE and a serving cell including but not limiting to PCell and SCell (for example, transmitting to PCell or SCell, receiving from PCell or SCell), the communication between the UE and the serving cell may include the communication between the UE/an apparatus of the UE and the network device (node) of the cell including but not limiting to PCell and SCell. Also note that, the expressions "network device" and the expression "node" may be used herein interchangeably. In other words, when reference is made to "network device", it also refers to "node".

According to the handover command including the activation indication, the UE may know that the activation of the SCell is needed, and may initiate the activation of the SCell during the handover. The target cell does not need to transmit further command to the UE to initiate the SCell activation.

The UE may start a handover procedure based on the handover command.

At step S304, the UE may generate a first message (msg1) for transmission to the target cell, wherein the first message is used for initiating a RACH process. The first message may include a RACH preamble to the target cell.

At step S306, the UE may obtain a second message (msg2) from the target cell in response to the first message, wherein the second message comprises a timing advance (TA) command. The TA may be initiated from the target cell to the UE to imply an adjustment of timing of the UE's uplink transmission timing. The UE may receive an RAR from the target cell including the TA command.

In some embodiments, the second message may further include a scheduling grant for allowing the UE to send a reference signal report to the target cell. For example, the UE may receive the RAR from the target cell with the TA and the scheduling grant. By obtaining the TA command and the scheduling grant in a same message, the communication between the UE and the target cell may be more simplified.

In response to reception of the second message, the UE may apply a TA value according to the TA command after a delay $T_3$ for applying a TA value according to the received TA command for uplink transmission in the target cell.

Furthermore, in response to reception of the second message, the UE may start a radio Frequency (RF) tuning process and a Baseband (BB) process for the activation of the SCell of the target cell.

Since the application of the TA value does not affect the UE RF and BB process for SCell activation, the UE may start the UE RF and BB process for SCell activation right after when the UE received the second message from the target PCell, and does not have to be delayed until application of the TA value. Thus, the direct SCell activation period may be shortened.

During the RF and BB process, the UE may cause interruption of transmission/reception of an active serving cell during an interruption window. A starting point of the interruption window occurs not earlier a starting of the first slot following the second message and not later than an end of a first complete Synchronization Signal Block (SSB) received following the second message.

The UE may start to report a valid Channel State Information (CSI) of the SCell after application of the TA value. According to a determination that application of a TA value according to the TA command is to be later than completion of the RF tuning process and the BB process, the UE may start to report the CSI of the SCell after the application of the TA value. According to a determination that the application of the TA value is not to be later than the completion of the RF tuning process and the BB process, the UE may report Out of range (OOR) CSI after the application of the TA value and the UE may start to report the valid CSI of the SCell after the completion of the RF tuning process.

In some embodiments, the UE may start the RF tuning process and the BB process for the activation of the SCell of the target cell after the RACH procedure with the target cell is guaranteed.

For CBRA, a typical RACH process includes the following four steps. At step 1, the UE may generate a first message (msg 1) for transmission to the target cell. The first message may include a RACH preamble to the target cell. At step 2, the UE may receive a second message (msg 2) as a RAR from the target cell. At step 3, the UE may generate a third message (msg 3) for transmission to the target cell. The third message may include a RRC connection request. The UE may transmit the third message after application of the TA value according to the TA command in the RAR. At step 4, the UE may obtain a fourth (msg 4) in response to the third message. The fourth message may include a contention resolution from the target cell. The UE may start the RF tuning process and the BB process for the activation of the SCell of the target cell in response to reception of msg 4.

For CFRA, a typical RACH process includes the following four steps. At step 1, the UE may generate a first message (msg 1) for transmission to the target cell. The first message may include a RACH preamble to the target cell. At step 2, the UE may receive a second message (msg 2) as a RAR from the target cell. The RACH is guaranteed after the above two messages are transmitted. The UE may start the RF tuning process and the BB process for the activation of the SCell of the target cell after/in response to reception of msg 2.

The SCell activation may be ready after the completion of the RF and BB process, and the UE may report a valid CSI of the SCell after completion of the RF tuning process and the BB process.

According to some aspects of the present disclosure, the direct SCell activation work flow can be optimized. By transmitting the scheduling grant with the TA command in the RAR, the communication between the UE and the target cell may be more simplified. By starting the RF and BB process for SCell activation in response to reception of the second message, the duration of the direct SCell activation may be shortened. By starting the RF and BB process for SCell activation after completion of the RACH process, the activation of the SCell may be started after the RACH with the target cell is guaranteed, which ensures that the activation of the SCell will not be unnecessary.

Figure 4:
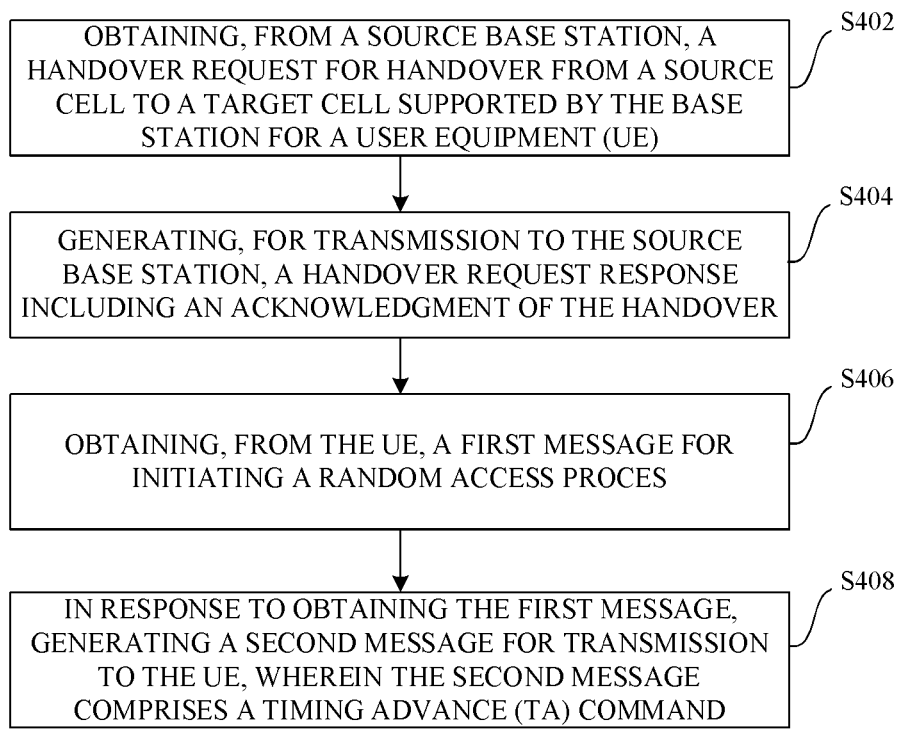
FIG. 4 illustrates a flowchart for an exemplary method for a base station in accordance with some embodiments.

FIG. 4 illustrates a flowchart for an exemplary method for a base station in accordance with some embodiments. The method 400 illustrated in FIG. 4 may be implemented by the base station 150 described in FIG. 1. The base station illustrated in FIG. 4 may be used to implement the target cell.

At step S402, the base station may obtain, from a source base station, a handover request for handover from a source cell to a target cell supported by the base station. The source base station is used for implementing the source cell. The handover request may be used to initiate a handover process to establish communication between the target cell and the UE. For direct SCell activation at handover, the handover request may include an activation indication of at least one SCell to be activated.

At step S404, the base station may generate, for transmission to the source base station, a handover request response. The handover request response may include an acknowledgment of the handover. The handover request response may further include an acknowledgment of the activation of the at least one SCell.

At step S406, the base station may obtain, from the UE, a first message for initiating a RACH procedure. The first message may include a RACH preamble to the target cell.

At step S408, the base station may generate a second message, for transmission to the UE, in response to obtaining the first message. The second message may include a timing advance (TA) command. The TA may be initiated from the target cell to the UE to imply an adjustment of timing of the UE's uplink transmission timing. The base station may transmit a RAR including the TA command as the second message to the UE.

In some embodiments, the second message may further include a scheduling grant for allowing the UE to send a reference signal report to the target cell. For example, the base station may transmit the RAR to the UE with the TA and the scheduling grant. By transmitting the TA command and the scheduling grant in a same message, the communication between the UE and the target cell may be more simplified.

The UE may start to report a valid Channel State Information (CSI) of the SCell after application of the TA value. According to a determination that application of a TA value according to the TA command is to be later than completion of the RF tuning process and the BB process, the base station may obtain the CSI of the SCell after the application of the TA value.

According to a determination that the application of the TA value is not to be later than the completion of the RF tuning process and the BB process, the base station may obtain Out of range (OOR) CSI after the application of the TA value and the base station may obtain the valid CSI of the SCell after the completion of the RF tuning process and the BB process.

In some embodiments, the UE may be allowed to start the RF tuning process and the BB process for the activation of the SCell of the target cell after the RACH procedure with the target cell is guaranteed.

For CBRA, a typical RACH process includes the following four steps. At step 1, the base station may obtain a first message (msg 1) from the UE. The first message may include a RACH preamble to the target cell. At step 2, the base station may generate, for transmission to the UE, a second message (msg 2) as a RAR. At step 3, the base station may obtain a third message (msg 3) for transmission from the UE. The third message may include a RRC connection request. The UE may transmit the third message after application of the TA value according to the TA command in the RAR, and the base station may obtain the third message after application of the TA value. At step 4, the base station may generate a fourth (msg 4) in response to obtaining the third message. The fourth message may include a contention resolution from the target cell. The UE may be allowed to start the RF tuning process and the BB process for the activation of the SCell of the target cell in response to reception of msg 4. An interruption window for the RF tuning process occurs not earlier than reception of the fourth message and not later than a first available SSB (or first available common SSB) received following the fourth message.

For CFRA, a typical RACH process includes the following four steps. At step 1, the base station may obtain a first message (msg 1) from the UE. The first message may include a RACH preamble to the target cell. At step 2, the base station may generate a second message (msg 2), for transmission to the UE, as a RAR. The RACH is guaranteed after the above two messages are transmitted. The UE may be allowed to start the RF tuning process and the BB process for the activation of the SCell of the target cell after/in response to reception of msg 2.

The SCell activation may be ready after the completion of the RF and BB process, and the base station may obtain a valid CSI of the SCell after completion of the RF tuning process and the BB process.

According to some aspects of the present disclosure, the direct SCell activation work flow can be optimized. By transmitting the scheduling grant with the TA command in the RAR, the communication between the UE and the target cell may be more simplified. By starting the RF and BB process for SCell activation in response to reception of the second message, the duration of the direct SCell activation may be shortened. By starting the RF and BB process for SCell activation after completion of the RACH process, the activation of the SCell may be started after the RACH with the target cell is guaranteed, which ensures that the activation of the SCell will not be unnecessary.

Figure 5:
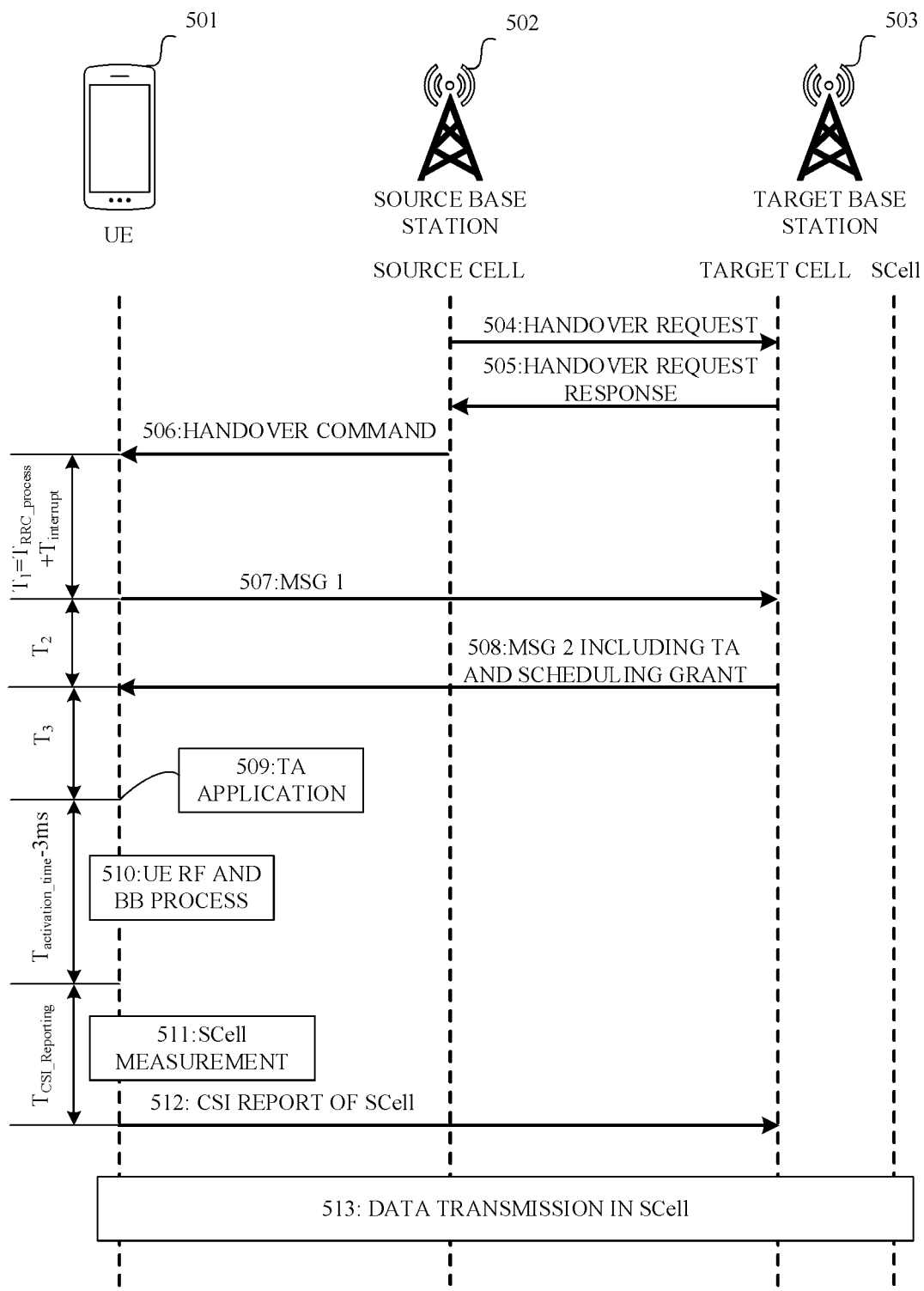
FIG. 5 illustrates a communication exchange in connection with direct SCell activation over handover, in accordance with some embodiments of the present disclosure.

FIG. 5 illustrates a communication exchange between a UE 501, a source base station 502 and a target base station 503 in connection with direct SCell activation over handover, in accordance with some embodiments of the present disclosure. The source cell may be supported by the source base station 502, and the target cell and the SCell of the target cell may be supported by the target base station 503. Although the target cell and the SCell of the target cell are supported by the same target base station in FIG. 5, the target cell and the SCell of the target cell can also be supported by different base stations, respectively.

Referring to FIG. 5, the communication exchange may start from operation 504.

At operation 504, the source base station 502 may transmit a handover request to the target base station 503. The handover request may be used for handover from the source cell to the target cell supported by the target base station. The handover request may further include an activation indication of the SCell to be activated. Operation 504 can be implemented according to the description with reference to Step S402.

At operation 505, the target base station 503 may transmit a handover request response to the source base station 502. The handover request response may include an acknowledgment of the handover. The handover request response may further include an acknowledgment of the activation of the at least one SCell. Operation 505 can be implemented according to the description with reference to Step S404.

At operation 506, in response to the acknowledgement from the target base station 503, the source base station 502 may transmit a handover command to the UE 501. Operation 506 can be implemented according to the description with reference to Step S202.

At operation 507, at the end of time period $T_1$, the UE may transmit msg 1 to the target base station 503. The msg 1 may include a RACH preamble to the target cell. The time period $T_1$ may include a RRC procedure delay $T_{RRC\_process}$ and interruption time $T_{interrupt}$ during handover. The RRC procedure delay $T_{RRC\_process}$ is defined in clause 12 of TS 38.331 [2], and the interruption time $T_{interrupt}$ is specified in clause 6.1.1 of TS 38.133. Operation 507 can be implemented according to the description with reference to Step S204/S406.

At operation 508, the target base station 503 may transmit msg 2 including a TA command and a scheduling grant (also referred to as an uplink grant) for allowing the UE to send a reference signal report to the target cell. The UE 501 will use the grant to report CSI of the to-be-activated SCell after the UE applying the TA command ($T_3$). Operation 508 can be implemented according to the description with reference to Step S206/S408.

The UE 501 may obtain the TA command from the target base station after a delay $T_2$. $T_2$ is defined as a delay from slot $$n + \frac{T_{RRC\_Process} + T_{interrupt}}{NR \text{ slot length}}$$

until the UE 501 has obtained the valid TA command for the target Cell and has obtained the scheduling grant for sending valid CSI report of to-be-activated SCell in the target cell. The slot n is a timing when the UE 501 receives the handover command. The NR slot length is with respect to the numerology of the SCell being activated.

At operation 509, after a delay $T_3$ for applying the received TA for uplink transmission in the target Cell, the UE 501 may apply a TA value according to the received TA command.

At operation 510, the UE 501 may perform a RF and BB process for SCell activation.

For the UE 501, the RF and BB behavior starts at least after the UE getting the TA and being ready to apply TA and the UE getting scheduling grant for sending CSI report of to-be-activated SCell in the target cell. As shown in FIG. 5, the UE501 may start the RF and BB behavior at the end of $T_3$.

After a duration of ($T_{activation\_time}$—the predetermined time period), the SCell activation is ready. $T_{activation\_time}$ is as specified in clause 8.3.2. TS 38.133.

At operation 511, the UE may start performing measurement of the SCell.

After a duration of $T_{CSI\_reporting}$, at operation 512, the UE 501 may transmit the CSI report of the SCell to the target base station. $T_{CSI\_Reporting}$ is as specified in clause 8.3.2, TS 38.133.

At operation 513, the UE 501 may perform data transmission in SCell.

The direct SCell activation period is designed as $N_{direct}$ as following.

$$N_{direct}=T_{RRC\_process}+T_{interrupt}+T_2+T_3+T_{activation\_time}+T_{CSI\_Reporting}-\text{the predetermined time period.}$$

Figure 6:
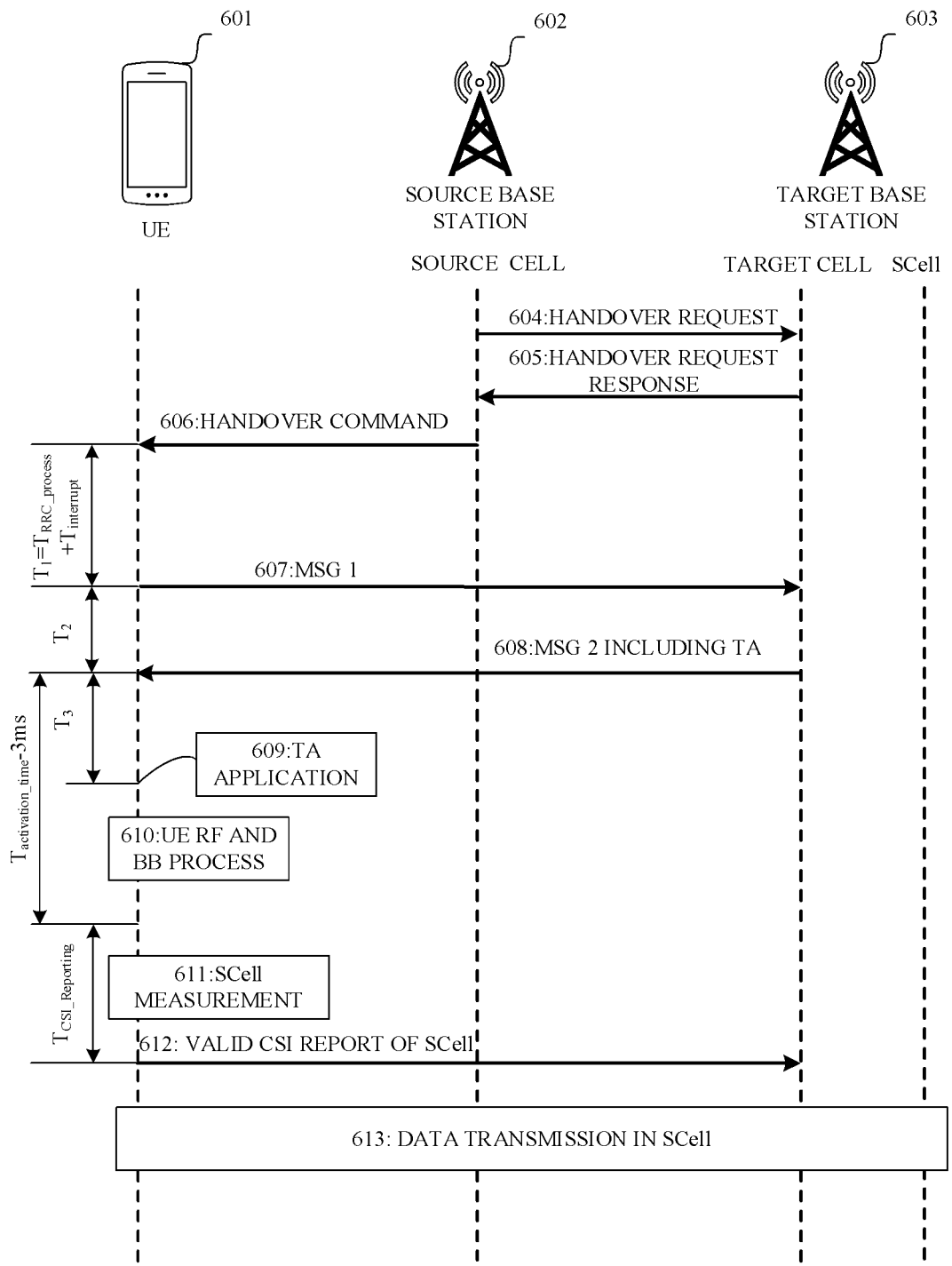
FIG. 6 illustrates another communication exchange in connection with direct SCell activation over handover, in accordance with some embodiments of the present disclosure.

FIG. 6 illustrates another communication exchange between a UE 601, a source base station 602 and a target base station 603 in connection with direct SCell activation over handover, in accordance with some embodiments of the present disclosure. The source cell may be supported by the source base station 602, and the target cell and the SCell of the target cell may be supported by the target base station 603. Although the target cell and the SCell of the target cell are supported by the same target base station in FIG. 6, the target cell and the SCell of the target cell can also be supported by different base stations, respectively.

Referring to FIG. 6, the communication exchange may start from operation 604.

At operation 604, the source base station 602 may transmit a handover request to the target base station 603. The handover request may be used for handover from the source cell to the target cell supported by the target base station. The handover request may further include an activation indication of the SCell to be activated. Operation 604 can be implemented according to the description with reference to Step S402.

At operation 605, the target base station 603 may transmit a handover request response to the source base station 602. The handover request response may include an acknowledgment of the handover. The handover request response may further include an acknowledgment of the activation of the at least one SCell. Operation 605 can be implemented according to the description with reference to Step S404.

At operation 606, in response to the acknowledgement from the target base station, the source base station 602 may transmit a handover command to the UE 601. Operation 606 can be implemented according to the description with reference to Step S202.

At operation 607, at the end of time period $T_1$, the UE may transmit msg 1 to the target base station 603. The msg 1 may include a RACH preamble to the target cell. The time period $T_1$ may include a RRC procedure delay $T_{RRC\_process}$ and interruption time $T_{interrupt}$ during handover. The RRC procedure delay $T_{RRC\_process}$ is defined in clause 12 of TS 38.331 [2], and the interruption time $T_{interrupt}$ is specified in clause 6.1.1 of TS 38.133. Operation 607 can be implemented according to the description with reference to Step S204/S406.

At operation 608, the target base station 603 may transmit msg 2 including at least a TA command. In some cases, the msg 2 may also include a scheduling grant (also referred to as an uplink grant) for allowing the UE to send a reference signal report to the target cell. The UE 601 will use the grant to report CSI of the to-be-activated SCell after the UE applying the TA command ($T_3$). Operation 608 can be implemented according to the description with reference to Step S206/S408.

The UE 601 may obtain the TA command from the target base station after a delay $T_2$. $T_2$ is defined as a delay from slot $$n + \frac{T_{RRC\_Process} + T_{interrupt}}{NR\ \text{slot length}}$$

until the UE 601 has obtained the valid TA command for the target cell. If the msg 2 also includes the scheduling grant, $T_2$ is defined as a delay from slot $$n + \frac{T_{RRC\_Process} + T_{interrupt}}{NR\ \text{slot length}}$$

until the UE 601 has obtained the valid TA command for the target cell and has obtained the scheduling grant for sending valid CSI report of to-be-activated SCell in the target cell. The slot n is a timing when the UE 601 receives the handover command. The NR slot length is with respect to the numerology of the SCell being activated.

At operation 609, after a delay $T_3$ for applying the received TA for uplink transmission in the target Cell, the UE 601 may apply a TA value according to the received TA command.

At operation 610, the UE 601 may perform a RF and BB process for SCell activation. As shown in FIG. 6, the UE 601 may start the RF and BB process in response to reception of the msg 2 and at the end of $T_2$. After a duration of ($T_{activation\_time}$—the predetermined time period), the SCell activation is ready.

If $T_3 \geq (T_{activation\_time}$—the predetermined time period), the UE 601 may report CSI of the SCell to be activated after the UE completes the TA application. If $T_3 < (T_{activation\_time}$—the predetermined time period), the UE 601 may report Out of Range (OOR) or index=0 CSI after the UE completes the application, and the UE may report valid CSI to the target base station 603 once the RF and BB process for SCell activation is completed.

At operation 611, the UE may start performing measurement of the SCell.

After a duration of $T_{CSI\_Reporting}$, at operation 612, the UE 601 may transmit the CSI report of the SCell to the target base station.

$T_{activation\_time}$ and $T_{CSI\_Reporting}$ is as specified in clause 8.3.2. TS 38.133, where the following definitions of $T_{FirstSSB}$ and $T_{FirstSSB\_Max}$ override the existing definitions:

$T_{FirstSSB}$ is used under a circumstance where a first Synchronization Signal Block (SSB) that the UE shall use for SCell activation is the first complete SSB indicated by the SMTC after slot $$n + \frac{T_{RRC\_Process} + T_{interrupt} + T_2}{NR \text{ slot length}}.$$

$T_{FirstSSB}$ is the time to the end of a first complete SSB burst indicated by the SSB-based Measurement Timing configuration (SMTC) after slot $$n + \frac{T_{RRC\_Process} + T_{interrupt} + T_2}{NR \text{ slot length}}.$$

$T_{FirstSSB\_Max}$ is used under a circumstance where a common SSB time occasion between active serving cells and SCell being activated that the UE shall use for SCell activation is the first complete common SSB indicated by the SMTC after slot $$n + \frac{T_{RRC\_Process} + T_{interrupt} + T_2}{NR \text{ slot length}}.$$

$T_{FirstSSB\_MAX}$ is the time to the end of the first complete SSB burst indicated by the SMTC after slot $$n + \frac{T_{RRC\_Process} + T_{interrupt} + T_2}{NR \text{ slot length}}.$$

During the RF and BB process for SCell activation, the UE 601 may be allowed to cause interruptions to the target cell (PCell) during an interruption window. The starting point of the interruption window on PCell shall not occur before slot $$n + 1 + \frac{T_{RRC\_Process} + T_{interrupt} + T_2}{NR \text{ slot length}},$$

and not occur after slot $$n + 1 + \frac{T_{RRC\_Process} + T_{interrupt} + T_2 + T_x}{NR \text{ slot length}}$$

The NR slot length is with respect to the numerology of the SCell being activated. $T_x$ is:
  $T_{FirstSSB}$, for any scenario where $T_{activation\_time}$ includes $T_{FirstSSB}$;
  $T_{FirstSSB\_MAX}$, for any scenario where $T_{activation\_time}$ includes $T_{FirstSSB\_MAX}$; or
  $T_{uncertainty\_MAC} + T_{FineTiming}$, for any scenario where $T_{activation\_time}$ time includes $T_{FineTiming}$.
  $T_{uncertainty\_MAC}$ is the time period between reception of the last activation command for PDCCH TCL PDSCH TC (when applicable) relative to:
  SCell activation command for known case;
  First valid L1-RSRP reporting for unknown case.
  $T_{FineTiming}$ is the time period between UE finish processing the last activation command for PDCCH TCI, PDSCH TCI (when applicable) and the timing of first complete available SSB corresponding to the TCI state.

At operation 613, the UE 601 may perform data transmission in SCell.

The direct SCell activation period is designed as $N_{direct}$ as following.

$$N_{direct} = T_{RRC\_process} + T_{interrupt} + T_2 + \max\{T3, T_{activation\_time} - \text{the predetermined time period}\} + T_{CSI\_Reporting}.$$

Figure 7:
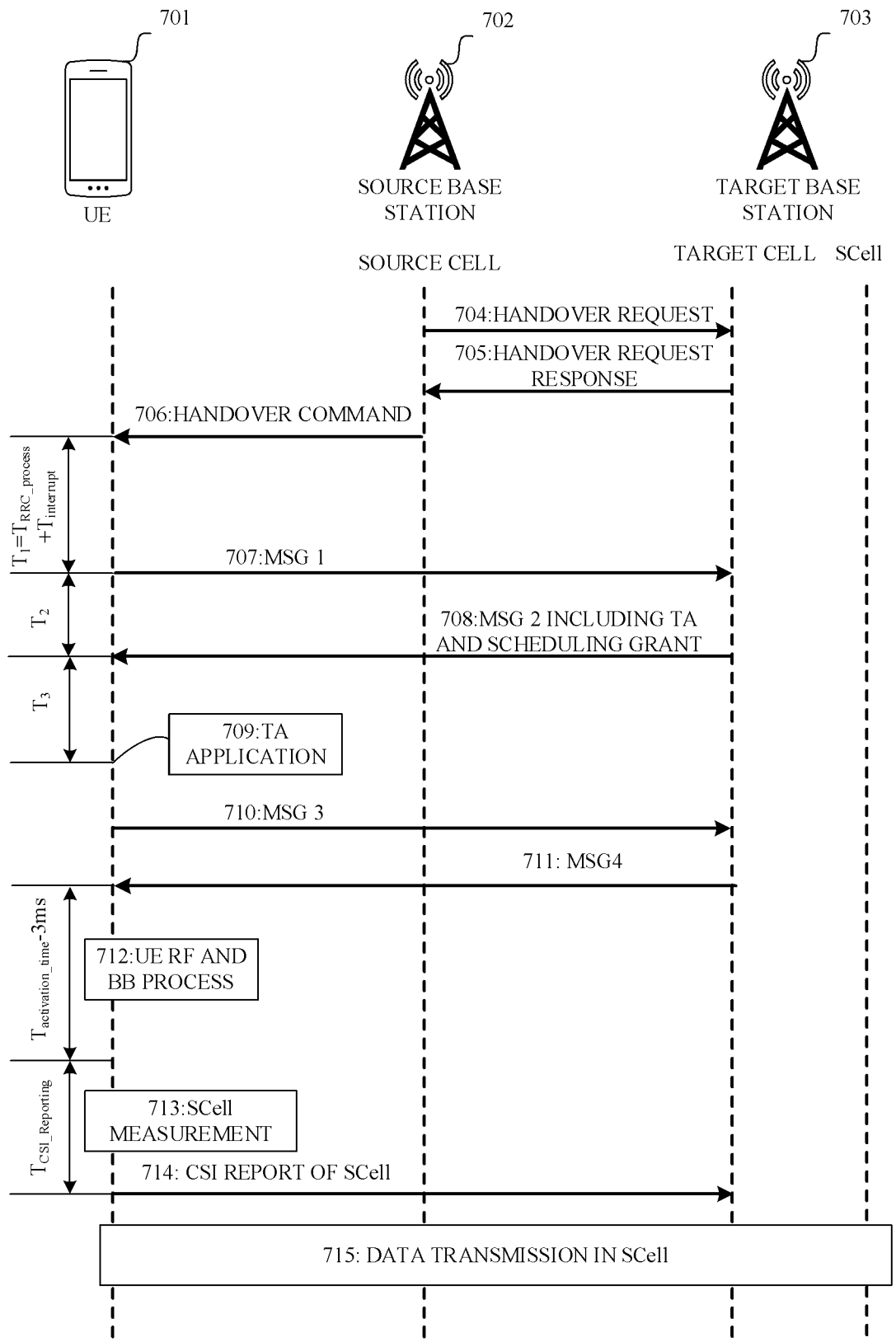
FIG. 7 illustrates yet another communication exchange in connection with direct SCell activation over handover, in accordance with some embodiments of the present disclosure.

FIG. 7 illustrates yet another communication exchange between a UE 701, a source base station 702 and a target base station 703 in connection with direct SCell activation over handover, in accordance with some embodiments of the present disclosure. The source cell may be supported by the source base station 702, and the target cell and the SCell of the target cell may be supported by the target base station 703. Although the target cell and the SCell of the target cell are supported by the same target base station in FIG. 7, the target cell and the SCell of the target cell can also be supported by different base stations, respectively.

Referring to FIG. 7, the communication exchange may start from operation 704.

At operation 704, the source base station 702 may transmit a handover request to the target base station 703. The handover request may be used for handover from the source cell to the target cell supported by the target base station. The handover request may further include an activation indication of the SCell to be activated. Operation 704 can be implemented according to the description with reference to Step S402.

At operation 705, the target base station 703 may transmit a handover request response to the source base station 702. The handover request response may include an acknowledgment of the handover. The handover request response may further include an acknowledgment of the activation of the at least one SCell. Operation 705 can be implemented according to the description with reference to Step S404.

At operation 706, in response to the acknowledgement from the target base station, the source base station 702 may transmit a handover command to the UE 701. Operation 706 can be implemented according to the description with reference to Step S202.

At operation 707, at the end of time period $T_1$, the UE may transmit msg 1 to the target base station 703. The msg 1 may include a RACH preamble to the target cell. The time period $T_1$ may include a RRC procedure delay $T_{RRC\_process}$ and interruption time $T_{interrupt}$ during handover. The RRC procedure delay $T_{RRC\_process}$ is defined in clause 12 of TS 38.331 [2], and the interruption time $T_{interrupt}$ is specified in clause 6.1.1 of TS 38.133. Operation 707 can be implemented according to the description with reference to Step S204/S406.

At operation 708, the target base station 703 may transmit msg 2 including at least a TA command. In some cases, the msg 2 may also include a scheduling grant (also referred to as an uplink grant) for allowing the UE to send a reference signal report to the target cell. The UE 701 will use the grant to report CSI of the to-be-activated SCell after the UE applying the TA command ($T_3$). Operation 708 can be implemented according to the description with reference to Step S206/S408.

The UE 701 may obtain the TA command from the target base station after a delay $T_2$. $T_2$ is defined as a delay from slot $$n + \frac{T_{RRC\_Process} + T_{interrupt}}{NR \text{ slot length}}$$

until the UE 701 has obtained the valid TA command for the target cell. If the msg 2 also includes the scheduling grant, T$_2$ is defined as a delay from slot $$n + \frac{T_{RRC\_Process} + T_{interrupt}}{NR \text{ slot length}}$$

until the UE 701 has obtained the valid TA command for the target cell and has obtained the scheduling grant for sending valid CSI report of to-be-activated SCell in the target cell. The slot n is a timing when the UE 701 receives the handover command. The NR slot length is with respect to the numerology of the SCell being activated.

At operation 709, after a delay T$_3$ for applying the received TA for uplink transmission in the target Cell, the UE 701 may apply a TA value according to the received TA command.

At operation 710, the UE 701 may transmit msg 3 including a RRC connection request to the target base station 703.

At operation 711, the target base station 703 may transmit msg 4 to the UE 701 in response to msg3. Msg 4 may include a contention resolution.

At operation 712, in response to the reception of msg 4, the UE 701 may perform a RF and BB process for SCell activation. After a duration of (T$_{activation\_time}$—the predetermined time period), the SCell activation is ready.

During the RF and BB process for SCell activation, the UE 701 may be allowed to cause interruptions to the target cell (PCell) during an interruption window. The starting point of the interruption window (UE RF tuning/retuning) on PCell shall not occur before RACH msg4 reception and shall not occur after "the first available SSB or first available common SSB between active serving cells and SCell being activated" after RACH msg4 reception.

At operation 713, the UE may start performing measurement of the SCell.

After a duration of T$_{CSI\_Reporting}$, at operation 714, the UE 701 may transmit the CSI report of the SCell to the target base station.

T$_{activation\_time}$ and T$_{CSI\_Reporting}$ is as specified in clause 8.3.2. TS 38.133, where the following definitions of T$_{FirstSSB}$ and T$_{FirstSSB\_Max}$ override the existing definitions:

At operation 713, the UE 701 may perform data transmission in SCell.

Figure 8:
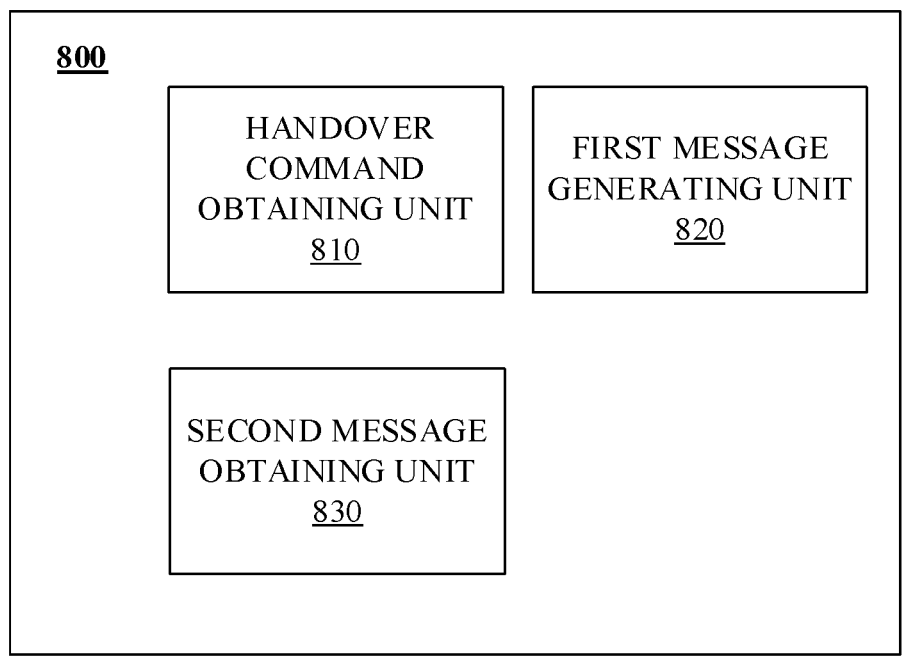
FIG. 8 illustrates an exemplary block diagram of an apparatus for a user equipment in accordance with some embodiments.

FIG. 8 illustrates an exemplary block diagram of an apparatus for a user equipment in accordance with some embodiments. The apparatus 800 illustrated in FIG. 8 may be used to implement the method 300 as illustrated in combination with FIG. 3.

As illustrated in FIG. 8, the apparatus 800 includes a handover command obtaining unit 810, a first message generating unit 820 and a second message obtaining unit 830.

The handover command obtaining unit 810 may be configured to obtain, from a source cell, a handover command for handover from the source cell to a target cell, the handover command including activation indication for an activation of a secondary cell (SCell) of the target cell.

The first message generating unit 820 may be configured to generate a first message for transmission to the target cell, wherein the first message is used for initiating a random access procedure.

The second message obtaining unit 830 may be configured to obtain a second message from the target cell in response to the first message, wherein the second message comprises a timing advance (TA) command.

Figure 9:
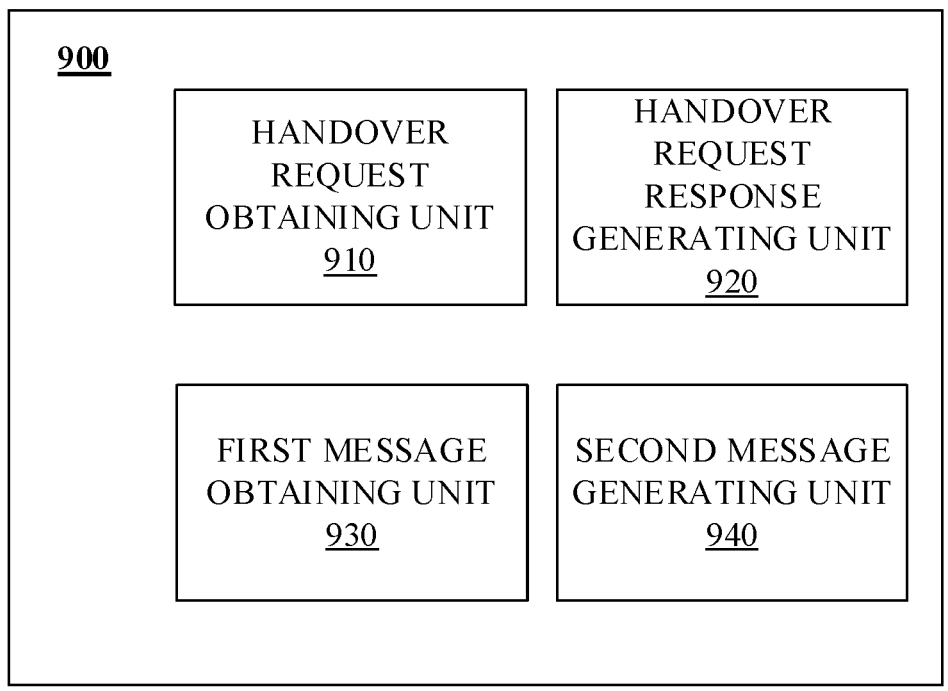
FIG. 9 illustrates an exemplary block diagram of an apparatus for base station in accordance with some embodiments.

FIG. 9 illustrates an exemplary block diagram of an apparatus for base station in accordance with some embodiments. The apparatus 900 illustrated in FIG. 9 may be used to implement the method 400 as illustrated in combination with FIG. 4.

As illustrated in FIG. 9, the apparatus 900 includes a handover request obtaining unit 910, a handover request response generating unit 920, a first message obtaining unit 930 and a second message generating unit 940.

The handover request obtaining unit 910 may be configured to obtain, from a source base station, a handover request for handover from a source cell to a target cell supported by the base station for a user equipment (UE).

The handover request response generating unit 920 may be configured to generate, for transmission to the source base station, a handover request response including an acknowledgment of the handover.

The first message obtaining unit 930 may be configured to obtain, from the UE, a first message for initiating a random access process.

The second message generating unit 940 may be configured to, in response to obtaining the first message, generate a second message for transmission to the UE, wherein the second message comprises a timing advance (TA) command.

According to some aspects of the present disclosure, the direct SCell activation work flow can be optimized. By transmitting the scheduling grant with the TA command in the RAR, the communication between the UE and the target cell may be more simplified. By starting the RF and BB process for SCell activation in response to reception of the second message, the duration of the direct SCell activation may be shortened. By starting the RF and BB process for SCell activation after completion of the RACH process, the activation of the SCell may be started after the RACH with the target cell is guaranteed, which ensures that the activation of the SCell will not be unnecessary.

Figure 10:
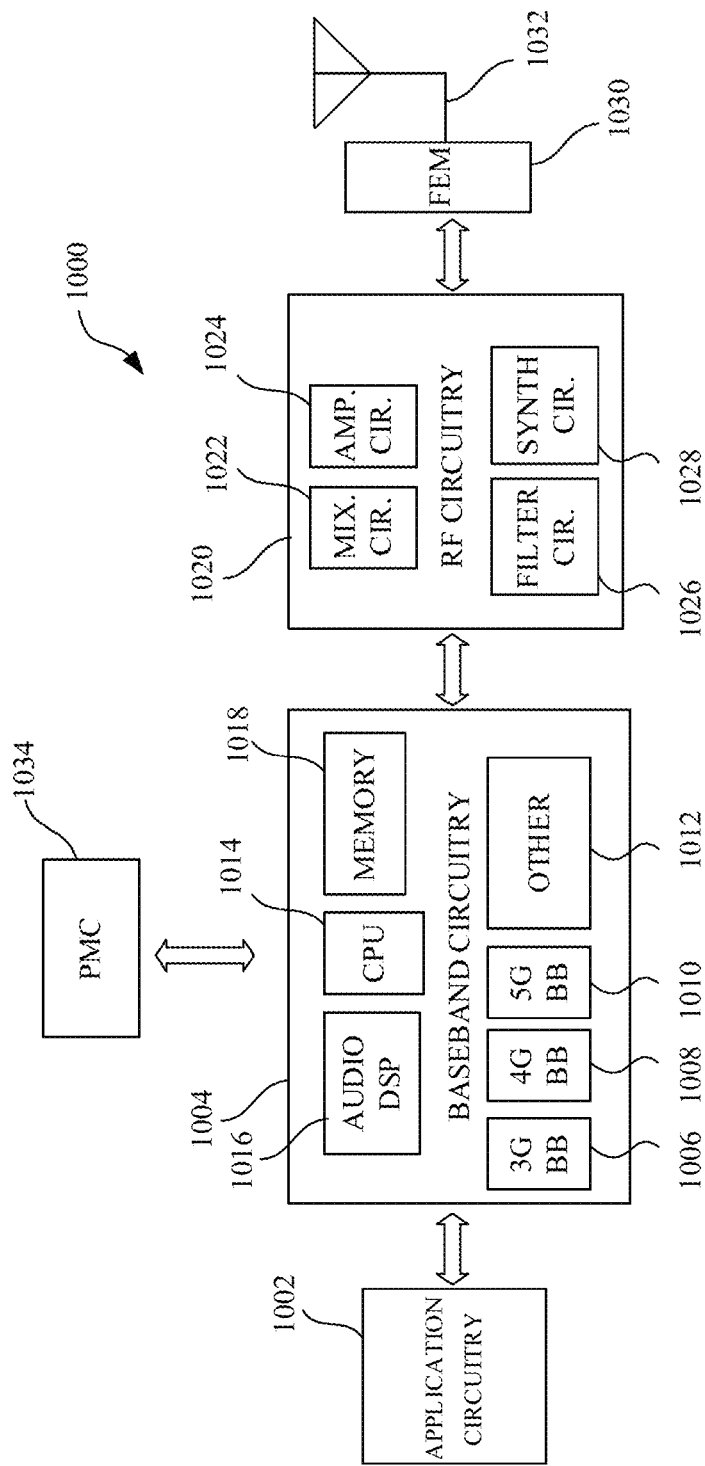
FIG. 10 illustrates a communication device (e.g. a UE or a base station) in accordance with some embodiments.

FIG. 10 illustrates example components of a device 1000 in accordance with some embodiments. In some embodiments, the device 1300 may include application circuitry 1002, baseband circuitry 1004, Radio Frequency (RF) circuitry (shown as RF circuitry 1020), front-end module (FEM) circuitry (shown as FEM circuitry 1030), one or more antennas 1032, and power management circuitry (PMC) (shown as PMC 1034) coupled together at least as shown. The components of the illustrated device 1000 may be included in a UE or a RAN node. In some embodiments, the device 1000 may include fewer elements (e.g., a RAN node may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1020 and to generate baseband signals for a transmit signal path of the RF circuitry 1020. The baseband circuitry 1004 may interface with the application circuitry 1002 for generation and processing of the baseband signals and for controlling operations of the RF circuitry 1020. For example, in some embodiments, the baseband circuitry 1004 may include a third generation (3G) baseband processor (3G baseband processor 1006), a fourth generation (4G) baseband processor (4G baseband processor 1008), a fifth generation (5G) baseband processor (5G baseband processor 1010), or other baseband processor(s) 1012 for other existing generations, generations in development or to be developed in the future (e.g., second generation (2G), sixth generation (6G), etc.). The baseband circuitry 1004 (e.g., one or more of baseband processors) may handle various radio control functions that enable communication with one or more radio networks via the RF circuitry 1020. In other embodiments, some or all of the functionality of the illustrated baseband processors may be included in modules stored in the memory 1018 and executed via a Central Processing ETnit (CPET 1014). The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo. Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include a digital signal processor (DSP), such as one or more audio DSP(s) 1016. The one or more audio DSP(s) 1016 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 1004 is configured to support radio communications of more than one wireless protocol may be referred to as multi-mode baseband circuitry.

The RF circuitry 1020 may enable communication with wireless networks using modulated electromagnetic radiation through a non-solid medium. In various embodiments, the RF circuitry 1020 may include switches, filters, amplifiers, etc. to facilitate the communication with the wireless network. The RF circuitry 1020 may include a receive signal path which may include circuitry to down-convert RF signals received from the FEM circuitry 1030 and provide baseband signals to the baseband circuitry 1004. The RF circuitry 1020 may also include a transmit signal path which may include circuitry to up-convert baseband signals provided by the baseband circuitry 1004 and provide RF output signals to the FEM circuitry 1030 for transmission.

In some embodiments, the receive signal path of the RF circuitry 1020 may include mixer circuitry 1022, amplifier circuitry 1024 and filter circuitry 1026. In some embodiments, the transmit signal path of the RF circuitry 1020 may include filter circuitry 1026 and mixer circuitry 1022. The RF circuitry 1020 may also include synthesizer circuitry 1028 for synthesizing a frequency for use by the mixer circuitry 1022 of the receive signal path and the transmit signal path. In some embodiments, the mixer circuitry 1022 of the receive signal path may be configured to down-convert RF signals received from the FEM circuitry 1030 based on the synthesized frequency provided by synthesizer circuitry 1028. The amplifier circuitry 1024 may be configured to amplify the down-converted signals and the filter circuitry 1026 may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, the mixer circuitry 1022 of the receive signal path may comprise passive mixers, although the scope of the embodiments is not limited in this respect.

In some embodiments, the mixer circuitry 1022 of the transmit signal path may be configured to up-convert input baseband signals based on the synthesized frequency provided by the synthesizer circuitry 1028 to generate RF output signals for the FEM circuitry 1030. The baseband signals may be provided by the baseband circuitry 1004 and may be filtered by the filter circuitry 1026.

In some embodiments, the mixer circuitry 1022 of the receive signal path and the mixer circuitry 1022 of the transmit signal path may include two or more mixers and may be arranged for quadrature downconversion and upconversion, respectively. In some embodiments, the mixer circuitry 1022 of the receive signal path and the mixer circuitry 1022 of the transmit signal path may include two or more mixers and may be arranged for image rejection (e.g., Hartley image rejection). In some embodiments, the mixer circuitry 1022 of the receive signal path and the mixer circuitry 1022 may be arranged for direct downconversion and direct upconversion, respectively. In some embodiments, the mixer circuitry 1022 of the receive signal path and the mixer circuitry 1022 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1020 may include analog-to-digital converter (ADC) and digital-to-analog converter (DAC) circuitry and the baseband circuitry 1004 may include a digital baseband interface to communicate with the RF circuitry 1020.

In some dual-mode embodiments, a separate radio IC circuitry may be provided for processing signals for each spectrum, although the scope of the embodiments is not limited in this respect.

In some embodiments, the synthesizer circuitry 1028 may be a fractional –N synthesizer or a fractional N/N+1 synthesizer, although the scope of the embodiments is not limited in this respect as other types of frequency synthesizers may be suitable. For example, synthesizer circuitry 1028 may be a delta-sigma synthesizer, a frequency multiplier, or a synthesizer comprising a phase-locked loop with a frequency divider.

The synthesizer circuitry 1028 may be configured to synthesize an output frequency for use by the mixer circuitry 1022 of the RF circuitry 1020 based on a frequency input and a divider control input. In some embodiments, the synthesizer circuitry 1028 may be a fractional N/N+1 synthesizer.

In some embodiments, frequency input may be provided by a voltage controlled oscillator (VCO), although that is not a requirement. Divider control input may be provided by cither the baseband circuitry 1004 or the application circuitry 1002 (such as an applications processor) depending on the desired output frequency. In some embodiments, a divider control input (e.g., N) may be determined from a look-up table based on a channel indicated by the application circuitry 1002.

Synthesizer circuitry 1028 of the RF circuitry 1020 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1028 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1020 may include an IQ/polar converter.

The FEM circuitry 1030 may include a receive signal path which may include circuitry configured to operate on RF signals received from one or more antennas 1032, amplify the received signals and provide the amplified versions of the received signals to the RF circuitry 1020 for further processing. The FEM circuitry 1030 may also include a transmit signal path which may include circuitry configured to amplify signals for transmission provided by the RF circuitry 1020 for transmission by one or more of the one or more antennas 1032. In various embodiments, the amplification through the transmit or receive signal paths may be done solely in the RF circuitry 1020, solely in the FEM circuitry 1030, or in both the RF circuitry 1020 and the FEM circuitry 1030.

In some embodiments, the FEM circuitry 1030 may include a TX/RX switch to switch between transmit mode and receive mode operation. The FEM circuitry 1030 may include a receive signal path and a transmit signal path. The receive signal path of the FEM circuitry 1030 may include an LNA to amplify received RF signals and provide the amplified received RF signals as an output (e.g., to the RF circuitry 1020). The transmit signal path of the FEM circuitry 1030 may include a power amplifier (PA) to amplify input RF signals (e.g., provided by the RF circuitry 1020), and one or more filters to generate RF signals for subsequent transmission (e.g., by one or more of the one or more antennas 1032).

In some embodiments, the PMC 1034 may manage power provided to the baseband circuitry 1004. In particular, the PMC 1034 may control power-source selection, voltage scaling, battery charging, or DC-to-DC conversion. The PMC 1034 may often be included when the device 1000 is capable of being powered by a battery, for example, when the device 1000 is included in a EGE. The PMC 1034 may increase the power conversion efficiency while providing desirable implementation size and heat dissipation characteristics.

FIG. 10 shows the PMC 1034 coupled only with the baseband circuitry 1004. However, in other embodiments, the PMC 1034 may be additionally or alternatively coupled with, and perform similar power management operations for, other components such as, but not limited to, the application circuitry 1002, the RF circuitry 1020, or the FEM circuitry 1030.

In some embodiments, the PMC 1034 may control, or otherwise be part of, various power saving mechanisms of the device 1000. For example, if the device 1000 is in an RRC Connected state, where it is still connected to the RAN node as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used to execute Layer 3, Layer 2, or Layer 1 functionality, while processors of the application circuitry 1002 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein. Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
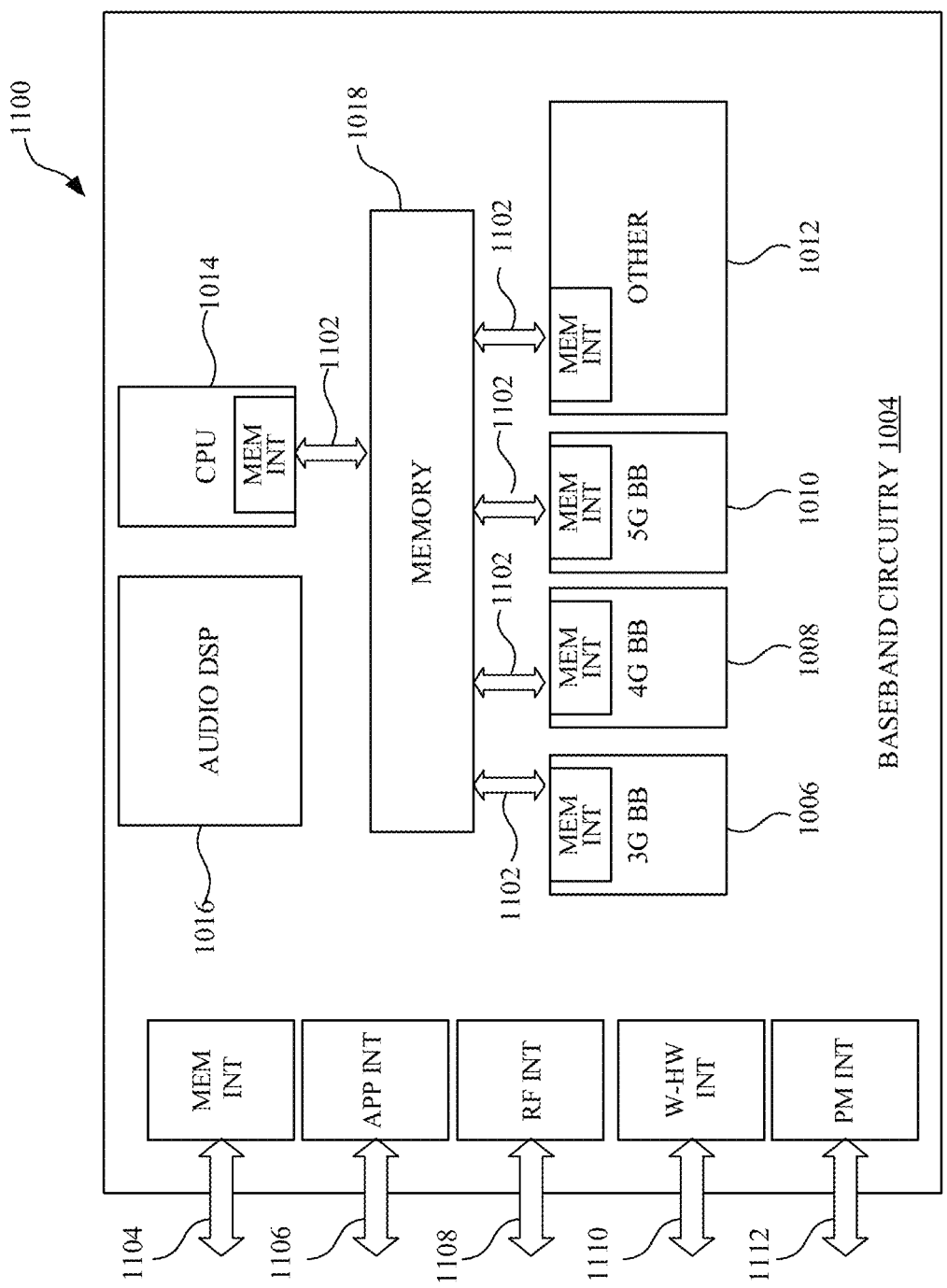
FIG. 11 illustrates example interfaces of baseband circuitry in accordance with some embodiments.

FIG. 11 illustrates example interfaces 1100 of baseband circuitry in accordance with some embodiments. As discussed above, the baseband circuitry 1004 of FIG. 10 may comprise 3G baseband processor 1006, 4G baseband processor 1008, 5G baseband processor 1010, other baseband processor(s) 1012, CPU 1014, and a memory 1018 utilized by said processors. As illustrated, each of the processors may include a respective memory interface 1102 to send/receive data to/from the memory 1018.

The baseband circuitry 1004 may further include one or more interfaces to communicatively couple to other circuitries/devices, such as a memory interface 1104 (e.g., an interface to send/receive data to/from memory external to the baseband circuitry 1004), an application circuitry interface 1106 (e.g., an interface to send/receive data to/from the application circuitry 1002 of FIG. 10), an RF circuitry interface 1108 (e.g., an interface to send/receive data to/from RF circuitry 1320 of FIG. 10), a wireless hardware connectivity interface 1110 (e.g., an interface to send/receive data to/from Near Field Communication (NFC) components, Bluetooth® components (e.g., Bluetooth® Low Energy). Wi-Fi® components, and other communication components), and a power management interface 1112 (e.g., an interface to send/receive power or control signals to/from the PMC 1034.

Figure 12:
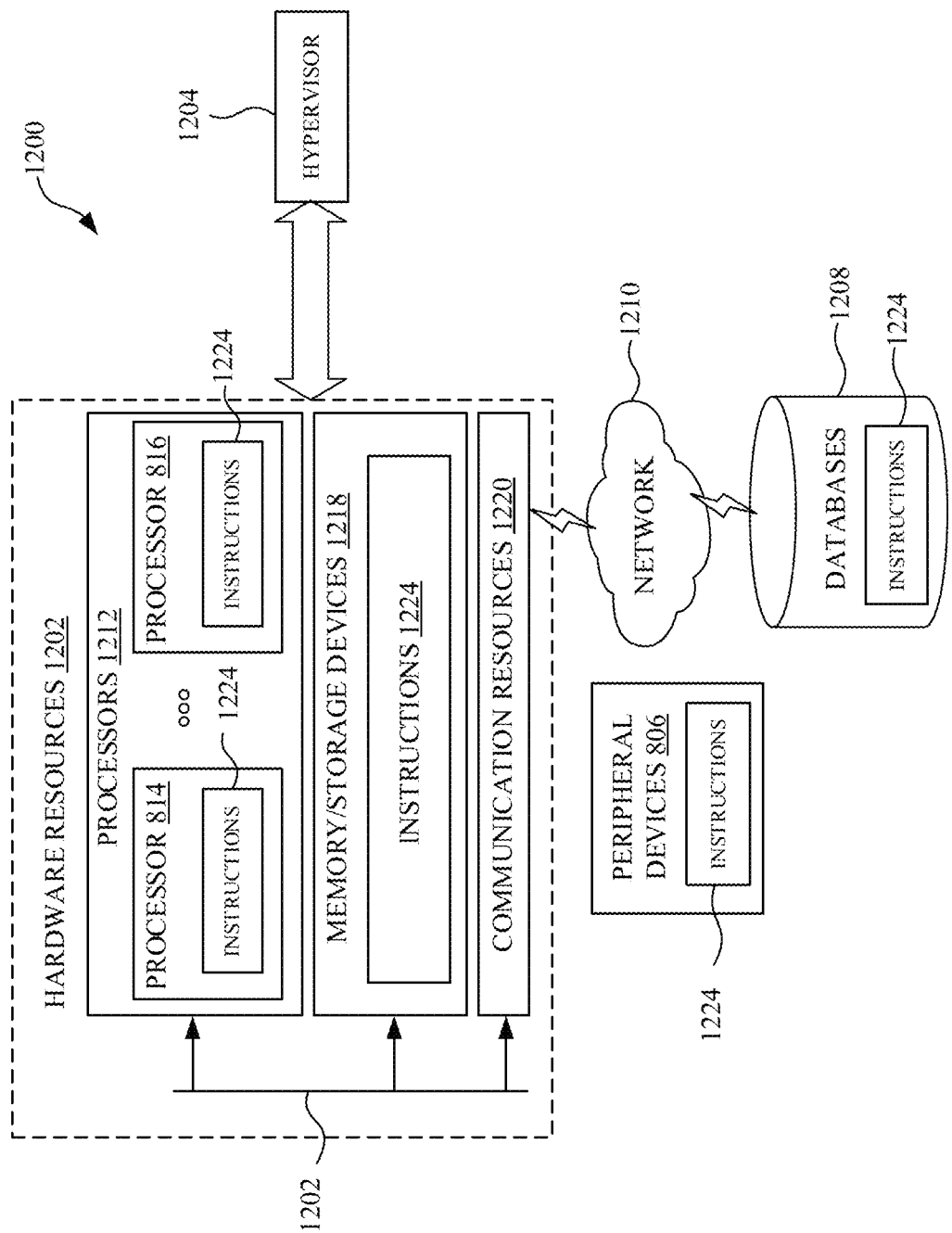
FIG. 12 illustrates components in accordance with some embodiments.

FIG. 12 is a block diagram illustrating components 1200, according to some example embodiments, able to read instructions from a machine-readable or computer-readable medium (e.g., a non-transitory machine-readable storage medium) and perform any one or more of the methodologies discussed herein. Specifically. FIG. 12 shows a diagrammatic representation of hardware resources 1202 including one or more processors 1212 (or processor cores), one or more memory/storage devices 1218, and one or more communication resources 1220, each of which may be communicatively coupled via a bus 1222. For embodiments where node virtualization (e.g., NFV) is utilized, a hypervisor 1204 may be executed to provide an execution environment for one or more network slices/sub-slices to utilize the hardware resources 1202.

The processors 1212 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1214 and a processor 1216.

The memory/storage devices 1218 may include main memory, disk storage, or any suitable combination thereof. The memory/storage devices 1218 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1220 may include interconnection or network interface components or other suitable devices to communicate with one or more peripheral devices 1206 or one or more databases 1208 via a network 1212. For example, the communication resources 1220 may include wired communication components (e.g., for coupling via a Universal Serial Bus (USB)), cellular communication components, NFC components, Bluetooth® components (e.g., Bluetooth® Low Energy), Wi-Fi, components, and other communication components.

Instructions 1224 may comprise software, a program, an application, an applet, an app, or other executable code for causing at least any of the processors 1212 to perform any one or more of the methodologies discussed herein. The instructions 1224 may reside, completely or partially, within at least one of the processors 1212 (e.g., within the processor's cache memory), the memory/storage devices 1218, or any suitable combination thereof. Furthermore, any portion of the instructions 1224 may be transferred to the hardware resources 1202 from any combination of the peripheral devices 1206 or the databases 1208. Accordingly, the memory of the processors 1212, the memory/storage devices 1218, the peripheral devices 1206, and the databases 1208 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 13:
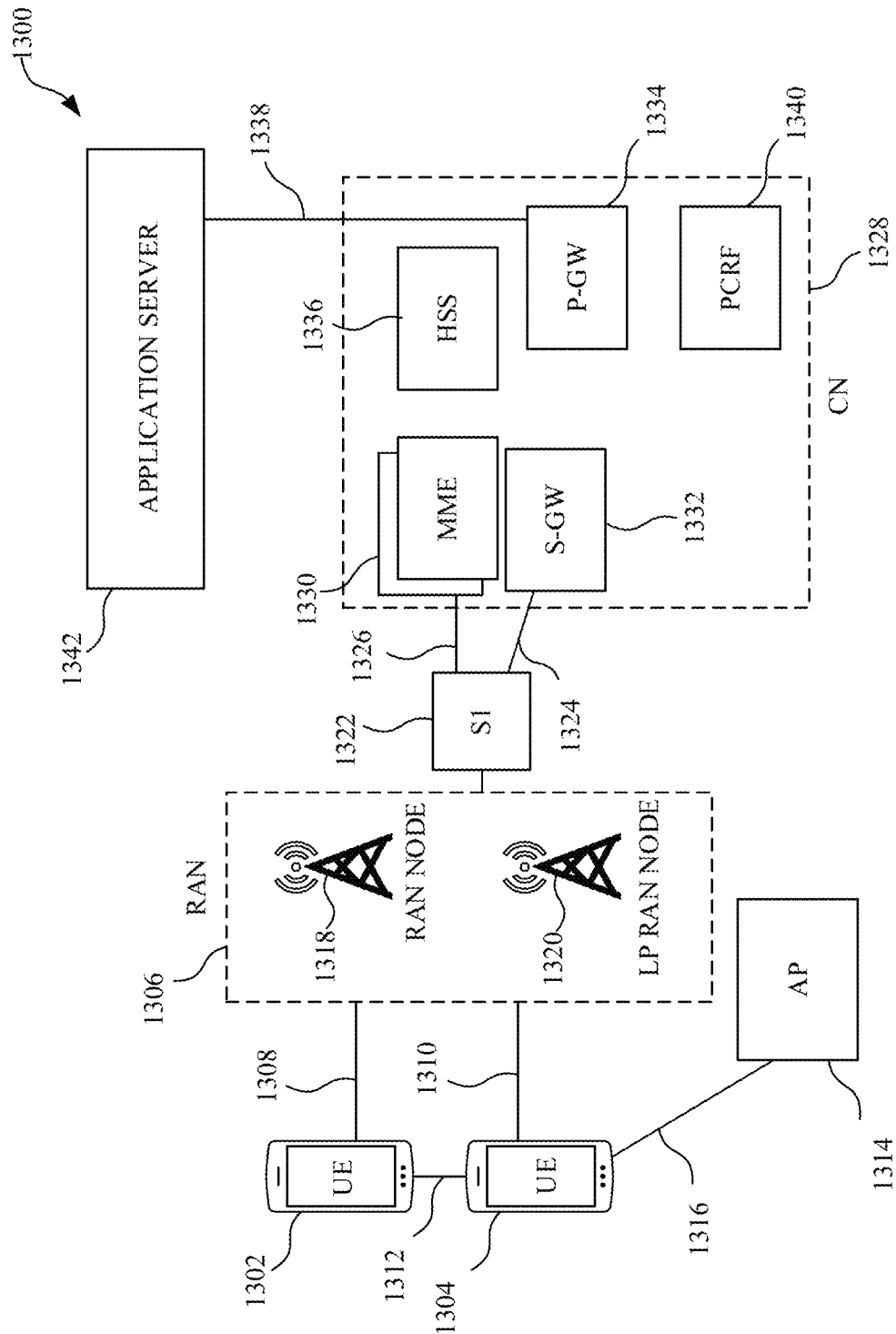
FIG. 13 illustrates an architecture of a wireless network in accordance with some embodiments.

FIG. 13 illustrates an architecture of a system 1300 of a network in accordance with some embodiments. The system 1300 includes one or more user equipment (UE), shown in this example as a UE 1302 and a UE 1304. The UE 1302 and the UE 1304 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 1302 and the UE 1304 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1302 and the UE 1304 may be configured to connect, e.g., communicatively couple, with a radio access network (RAN), shown as RAN 1306. The RAN 1306 may be, for example, an Evolved ETniversal Mobile Telecommunications System (ETMTS) Terrestrial Radio Access Network (E-UTRAN), a NextGen RAN (NG RAN), or some other type of RAN. The UE 1302 and the UE 1304 utilize connection 1308 and connection 1310, respectively, each of which comprises a physical communications interface or layer (discussed in further detail below); in this example, the connection 1308 and the connection 1310 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1302 and the UE 1304 may further directly exchange communication data via a ProSe interface 1312. The ProSe interface 1312 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1304 is shown to be configured to access an access point (AP), shown as AP 1314, via connection 1316. The connection 1316 can comprise a local wireless connection, such as a connection consistent with any IEEE 802.11 protocol, wherein the AP 1314 would comprise a wireless fidelity (WiFi®) router. In this example, the AP 1314 may be connected to the Internet without connecting to the core network of the wireless system (described in further detail below).

The RAN 1306 can include one or more access nodes that enable the connection 1308 and the connection 1310. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1306 may include one or more RAN nodes for providing macrocells, e.g., macro RAN node 1318, and one or more RAN nodes for providing femtocells or picocells (e.g., cells having smaller coverage areas, smaller user capacity, or higher bandwidth compared to macrocells), e.g., a low power (LP) RAN node such as LP RAN node 1320.

Any of the macro RAN node 1318 and the LP RAN node 1320 can terminate the air interface protocol and can be the first point of contact for the UE 1302 and the UE 1304. In some embodiments, any of the macro RAN node 1318 and the LP RAN node 1320 can fulfill various logical functions for the RAN 1306 including, but not limited to, radio network controller (RNC) functions such as radio bearer management, uplink and downlink dynamic radio resource management and data packet scheduling, and mobility management.

In accordance with some embodiments, the UE 1302 and the UE 1304 can be configured to communicate using Orthogonal Frequency-Division Multiplexing (OFDM) communication signals with each other or with any of the macro RAN node 1318 and the LP RAN node 1320 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the macro RAN node 1318 and the LP RAN node 1320 to the UE 1302 and the UE 1304, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1302 and the UE 1304. The physical downlink control channel (PDCCH) may carry information about the transport format and resource allocations related to the PDSCH channel, among other things. It may also inform the UE 1302 and the UE 1304 about the transport format, resource allocation, and H-ARQ (Hybrid Automatic Repeat Request) information related to the uplink shared channel. Typically, downlink scheduling (assigning control and shared channel resource blocks to the UE 1304 within a cell) may be performed at any of the macro RAN node 1318 and the LP RAN node 1320 based on channel quality information fed back from any of the UE 1302 and UE 1304. The downlink resource assignment information may be sent on the PDCCH used for (e.g., assigned to) each of the UE 1302 and the UE 1304.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1306 is communicatively coupled to a core network (CN), shown as CN 1328—via an S1 interface 1322. In embodiments, the CN 1328 may be an evolved packet core (EPC) network, a NextGen Packet Core (NPC) network, or some other type of CN. In this embodiment the S1 interface 1322 is split into two parts: the S1-U interface 1324, which carries traffic data between the macro RAN node 1318 and the LP RAN node 1320 and a serving gateway (S-GW), shown as S-GW 1332, and an S1-mobility management entity (MME) interface, shown as S1-MME interface 1326, which is a signaling interface between the macro RAN node 1318 and LP RAN node 1320 and the MME(s) 1330.

In this embodiment, the CN 1328 comprises the MME(s) 1330, the S-GW 1332, a Packet Data Network (PDN) Gateway (P-GW) (shown as P-GW 1334), and a home subscriber server (HSS) (shown as HSS 1336). The MME(s) 1330 may be similar in function to the control plane of legacy Serving General Packet Radio Service (GPRS) Support Nodes (SGSN). The MME(s) 1330 may manage mobility aspects in access such as gateway selection and tracking area list management. The HSS 1336 may comprise a database for network users, including subscription-related information to support the network entities' handling of communication sessions. The CN 1328 may comprise one or several HSS 1336, depending on the number of mobile subscribers, on the capacity of the equipment, on the organization of the network, etc. For example, the HSS 1336 can provide support for routing/roaming, authentication, authorization, naming/addressing resolution, location dependencies, etc.

The S-GW 1332 may terminate the S1 interface 322 towards the RAN 1306, and routes data packets between the RAN 1306 and the CN 1328. In addition, the S-GW 1332 may be a local mobility anchor point for inter-RAN node handovers and also may provide an anchor for inter-3 GPP mobility. Other responsibilities may include lawful intercept, charging, and some policy enforcement.

The P-GW 1334 may terminate an SGi interface toward a PDN. The P-GW 1334 may route data packets between the CN 1328 (e.g., an EPC network) and external networks such as a network including the application server 1342 (alternatively referred to as application function (AF)) via an Internet Protocol (IP) interface (shown as IP communications interface 1338). Generally, an application server 1342 may be an element offering applications that use IP bearer resources with the core network (e.g., ETMTS Packet Services (PS) domain, LTE PS data services, etc.). In this embodiment, the P-GW 1334 is shown to be communicatively coupled to an application server 1342 via an IP communications interface 1338. The application server 1342 can also be configured to support one or more communication services (e.g., Voice-over-Internet Protocol (VoIP) sessions, PTT sessions, group communication sessions, social networking services, etc.) for the UE 1302 and the UE 1304 via the CN 1328.

The P-GW 1334 may further be a node for policy enforcement and charging data collection. A Policy and Charging Enforcement Function (PCRF) (shown as PCRF 1340) is the policy and charging control element of the CN 1328. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1340 may be communicatively coupled to the application server 1342 via the P-GW 1334. The application server 1342 may signal the PCRF 1340 to indicate a new service flow and select the appropriate Quality of Service (QoS) and charging parameters. The PCRF 1340 may provision this rule into a Policy and Charging Enforcement Function (PCEF) (not shown) with the appropriate traffic flow template (TFT) and QoS class of identifier (QCI), which commences the QoS and charging as specified by the application server 1342.

Additional Examples

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE), comprising: obtaining, from a source cell, a handover command for handover from the source cell to a target cell, the handover command including activation indication for an activation of a secondary cell (SCell) of the target cell; generating a first message for transmission to the target cell, wherein the first message is used for initiating a random access procedure; obtaining a second message from the target cell in response to the first message, wherein the second message comprises a timing advance (TA) command.

Example 2 is the method of Example 1, wherein the second message further comprises a scheduling grant for allowing the UE to send a reference signal report to the target cell.

Example 3 is the method of Example 1, further comprising: starting a Radio Frequency (RF) tuning process and a baseband (BB) process for the activation of the SCell of the target cell in response to reception of the second message.

Example 4 is the method of Example 3, further comprising: according to a determination that application of a TA value according to the TA command is to be later than completion of the RF tuning process and the BB process, starting to report a valid Channel State Information (CSI) of the SCell after the application of the TA value; and according to a determination that the application of the TA value is not to be later than the completion of the RF tuning process and the BB process, reporting Out of range (OOR) CSI after the application of the TA value and starting to report the valid CSI of the SCell after the completion of the RF tuning process.

Example 5 is the method of Example 3, wherein the starting the RF tuning process for the activation of the SCell of the target cell comprises: causing interruption of transmission/reception of an active serving cell during an interruption window.

Example 6 is the method of Example 5, wherein a starting point of the interruption window occurs not earlier a starting of the first slot following the second message and not later than an end of a first complete Synchronization Signal Block (SSB) received following the second message.

Example 7 is the method of Example 1, further comprising: generating a third message for transmission to the target cell, wherein the third message comprises a Radio Resource Control (RRC) connection request; obtaining a fourth message in response to the third message, wherein the fourth message comprises a contention resolution; and starting a Radio Frequency (RF) tuning process and a baseband (BB) process for activation of the SCell of the target cell in response to reception of the fourth message.

Example 8 is the method of Example 7, wherein the third message is transmitted after application of a TA value according to the TA command.

Example 9 is the method of Example 8, further comprising: reporting a valid CSI of the SCell after completion of the RF tuning process and the BB process.

Example 10 is a method for a base station, comprising: obtaining, from a source base station, a handover request for handover from a source cell to a target cell supported by the base station for a user equipment (UE); generating, for transmission to the source base station, a handover request response including an acknowledgment of the handover: obtaining, from the UE, a first message for initiating a random access process; in response to obtaining the first message, generating a second message for transmission to the UE, wherein the second message comprises a timing advance (TA) command.

Example 11 is the method of Example 10, wherein the second message further comprises a scheduling grant for allowing the UE to send a reference signal report to the target cell.

Example 12 is the method of Example 10, further comprising: according to a determination that application of a TA value according to the TA command is to be later than completion of a Radio Frequency (RF) tuning process and a baseband (BB) process, obtaining a valid Channel State Information (CSI) of a secondary cell (SCell) of the target cell after the application of the TA value; and according to a determination that the application of the TA value is not to be later than the completion of the RF tuning process and the BB process, obtaining Out of Range (OOR) CSI after the application of the TA value and reporting the valid CSI of the SCell after the completion of the RF tuning process.

Example 13 is the method of Example 10, further comprising: obtaining, from the UE, a third message, wherein the third message comprises a Radio Resource Control (RRC) connection request; and in response to obtaining the third message, generating a fourth message for transmission to the UE, wherein the fourth message comprises a contention resolution, wherein the UE is allowed to start a Radio Frequency (RF) tuning process and a baseband (BB) process in response to reception of the fourth message.

Example 14 is the method of Example 13, wherein an interruption window for the RF tuning process occurs not earlier than reception of the fourth message and not later than a first available Synchronization Signal Block (SSB) received following the fourth message.

Example 15 is the method of Example 13, further comprising: obtaining, from the UE, a valid CSI of the SCell after completion of the RF tuning process and the BB process.

Example 16 is an apparatus for a user equipment (UE), the apparatus comprising: one or more processors configured to perform steps of the method according to any of Examples 1-9; and a memory interface configured to send to a memory the first message and the second message.

Example 17 is an apparatus for a base station, the apparatus comprising: one or more processors configured to perform steps of the method according to any of Examples 10-15; and a memory interface configured to send to a memory the first message and the second message.

Example 18 is a computer readable medium having computer programs stored thereon which, when executed by one or more processors, cause an apparatus to perform steps of the method according to any of Examples 1-15.

Example 19 is an apparatus for a communication device, comprising means for performing steps of the method according to any of Examples 1-15.

Example 20 is computer program product comprising computer programs which, when executed by one or more processors, cause an apparatus to perform steps of the method according to any of Examples 1-15.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/ctc, can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), comprising:
obtaining, from a source cell, a handover command for handover from the source cell to a target cell, the handover command including activation indication for an activation of a secondary cell (SCell) of the target cell;
generating a first message for transmission to the target cell, wherein the first message is used for initiating a random access procedure;
obtaining a second message from the target cell in response to the first message, wherein the second message comprises:
a timing advance (TA) command; and
a scheduling grant for allowing the UE to send a reference signal report of a reference signal of the SCell to the target cell.

2. The method of claim 1, further comprising:
starting a Radio Frequency (RF) tuning process and a baseband (BB) process for the activation of the SCell of the target cell in response to reception of the second message.

3. The method of claim 2, further comprising:
according to a determination that application of a TA value according to the TA command is to be later than completion of the RF tuning process and the BB process, starting to report a valid Channel State Information (CSI) of the SCell after the application of the TA value; and
according to a determination that the application of the TA value is not to be later than the completion of the RF tuning process and the BB process, reporting Out of range (OOR) CSI after the application of the TA value and starting to report the valid CSI of the SCell after the completion of the RF tuning process.

4. The method of claim 2, wherein the starting the RF tuning process for the activation of the SCell of the target cell comprises:
causing interruption of transmission/reception of an active serving cell during an interruption window.

5. The method of claim 4, wherein a starting point of the interruption window occurs not earlier a starting of the first slot following the second message and not later than an end of a first complete Synchronization Signal Block (SSB) received following the second message.

6. The method of claim 1, further comprising:
generating a third message for transmission to the target cell, wherein the third message comprises a Radio Resource Control (RRC) connection request;
obtaining a fourth message in response to the third message, wherein the fourth message comprises a contention resolution; and
starting a Radio Frequency (RF) tuning process and a baseband (BB) process for activation of the SCell of the target cell in response to reception of the fourth message.

7. The method of claim 6, wherein the third message is transmitted after application of a TA value according to the TA command.

8. The method of claim 7, further comprising:
reporting a valid CSI of the SCell after completion of the RF tuning process and the BB process.

9. A method for a base station, comprising:
obtaining, from a source base station, a handover request for handover from a source cell to a target cell supported by the base station for a user equipment (UE);
generating, for transmission to the source base station, a handover request response including an acknowledgment of the handover;
obtaining, from the UE, a first message for initiating a random access process;
in response to obtaining the first message, generating a second message for transmission to the UE, wherein the second message comprises:
a timing advance (TA) command; and
a scheduling grant for allowing the UE to send a reference signal report of a reference signal of the SCell to the target cell.

10. The method of claim 9, further comprising:
according to a determination that application of a TA value according to the TA command is to be later than completion of a Radio Frequency (RF) tuning process and a baseband (BB) process, obtaining a valid Channel State Information (CSI) of a secondary cell (SCell) of the target cell after the application of the TA value; and
according to a determination that the application of the TA value is not to be later than the completion of the RF tuning process and the BB process, obtaining Out of Range (OOR) CSI after the application of the TA value and reporting the valid CSI of the SCell after the completion of the RF tuning process.

11. The method of claim 9, further comprising:
obtaining, from the UE, a third message, wherein the third message comprises a Radio Resource Control (RRC) connection request; and
in response to obtaining the third message, generating a fourth message for transmission to the UE, wherein the fourth message comprises a contention resolution,
wherein the UE is allowed to start a Radio Frequency (RF) tuning process and a baseband (BB) process in response to reception of the fourth message.

12. The method of claim 11, wherein an interruption window for the RF tuning process occurs not earlier than reception of the fourth message and not later than a first available Synchronization Signal Block (SSB) received following the fourth message.

13. The method of claim 11, further comprising:
obtaining, from the UE, a valid CSI of the SCell after completion of the RF tuning process and the BB process.

* * * * *